Nov. 14, 1950 — A. CHEVALLIER — 2,529,723
DEVICE FOR MEASURING AND COMPARING FUNCTIONS
Filed April 5, 1945 — 4 Sheets-Sheet 1
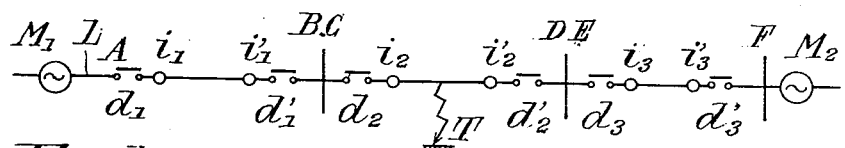
Fig.1
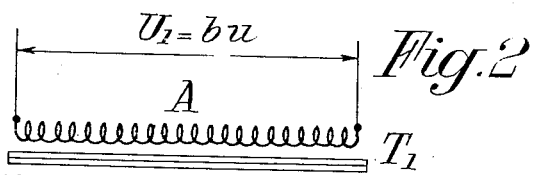
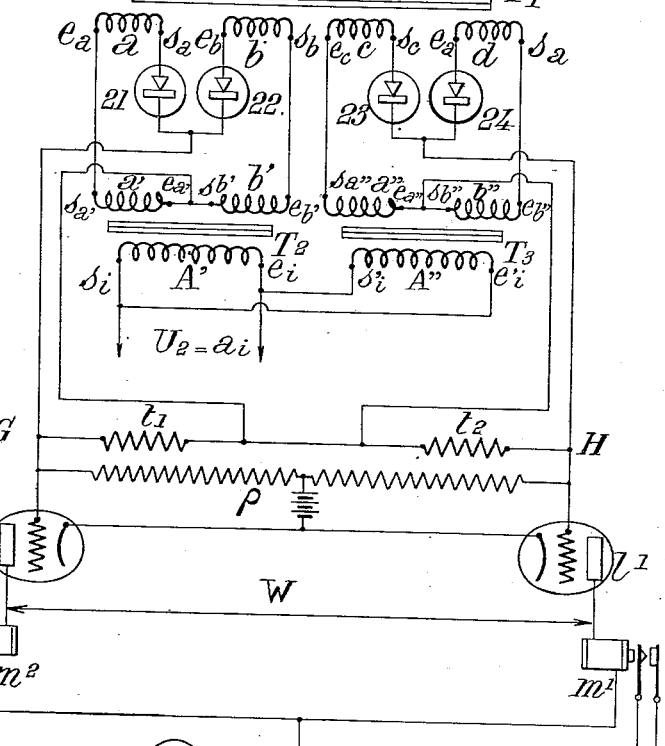
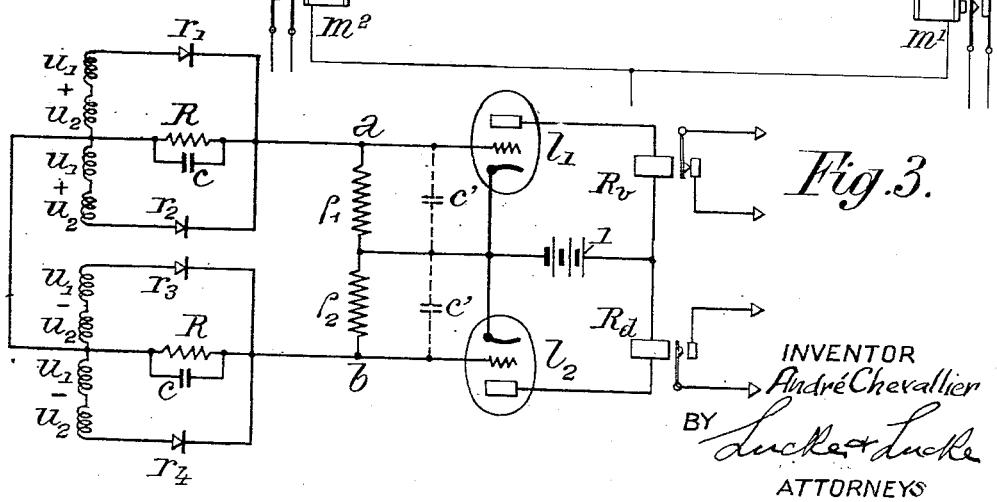
Fig.3.
INVENTOR
André Chevallier
BY Lucke & Lucke
ATTORNEYS Nov. 14, 1950      A. CHEVALLIER      2,529,723

DEVICE FOR MEASURING AND COMPARING FUNCTIONS

Filed April 5, 1945      4 Sheets-Sheet 2

INVENTOR
André Chevallier
BY
Lucke & Lucke
ATTORNEYS

Nov. 14, 1950  A. CHEVALLIER  2,529,723
DEVICE FOR MEASURING AND COMPARING FUNCTIONS
Filed April 5, 1945  4 Sheets-Sheet 3

INVENTOR
André Chevallier
BY
ATTORNEYS

INVENTOR
André Chevallier
BY
Lucker & Lucker
ATTORNEYS

Patented Nov. 14, 1950

2,529,723

UNITED STATES PATENT OFFICE 2,529,723

DEVICE FOR MEASURING AND COMPARING FUNCTIONS

André Chevallier, Paris, France, assignor to Société Union D'Electricite, Paris (Seine), France, a society of France Application April 5, 1945, Serial No. 586,778
In France April 14, 1942

Section 1, Public Law 690, August 8, 1946
Patent expires April 14, 1962

2 Claims. (Cl. 172—245)

My invention relates to apparatus for comparing the phases of two sinusoidal factors of the same frequency. The invention is more especally, although not exclusively, concerned with telecontrol devices of this kind used for the discriminative protection of electric distribution systems or in connection with other remote control systems.

The object of the present invention is to provide apparatus of this kind which are better adapted to meet the requirements of practice than those used for the same purpose up to the present time.

Preferred embodiments of the present invention will be hereinafter described with reference to the accompanying drawings, given merely by way of example, and in which:

Fig. 1 is a diagram showing the arrangement of the protection apparatus in several sections of a line, and indicating the direction of the currents that take place when a short-circuit occurs;

Figs. 2 and 3 are two diagrams of comparator devices made according to two embodiments of my invention;

Figure 9:
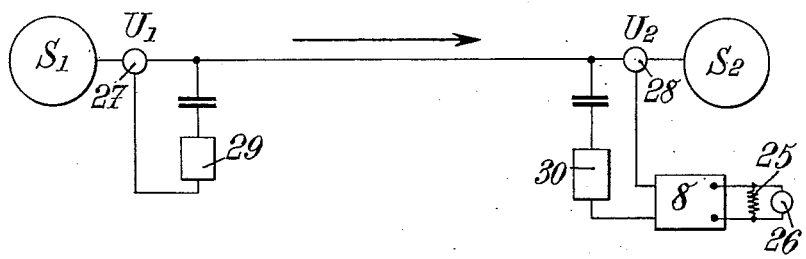
Figure 10:
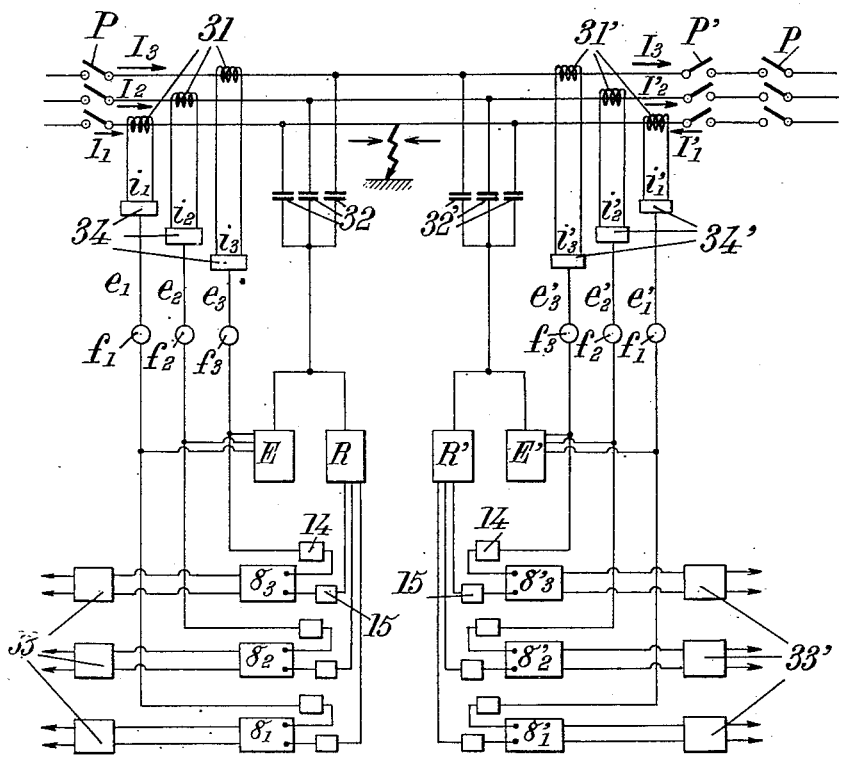
Figure 11:
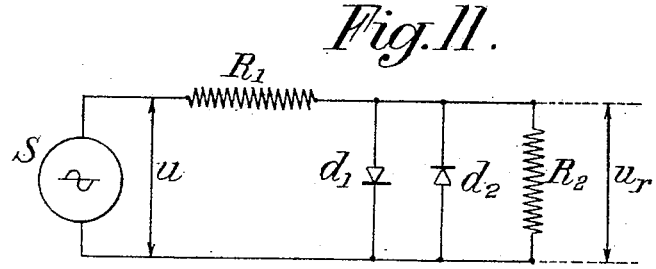
Figure 12:
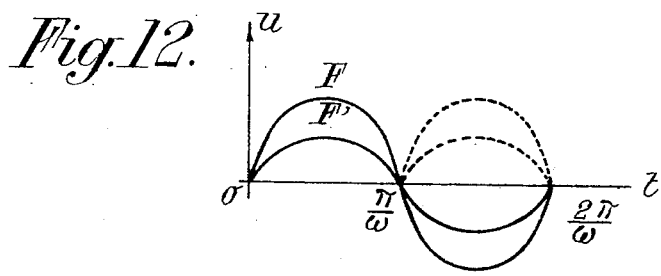

Fig. 9 diagrammatically shows a system for measuring or recording, eventually for tele-regulation purposes, the phase difference angle existing in voltages or currents on the input and output side of two stations of an energy distribution system, according to the invention;

Fig. 10 shows an arrangement according to the present invention for discriminative protection purposes;

Fig. 11 diagrammatically shows a voltage limiting device to be included in a system according to the invention;

Fig. 12 is a diagram of the voltages on the input and output sides of this limiting device.

In the following description, it will be supposed that the invention is applied to the protection of an energy transmission network.

In Fig. 1, I have diagrammatically shown, by way of example, a line L supposed to be fed at both ends by groups of machines $M_1M_2$. Several sections are illustrated at AB, CD, EF, with their circuit-breakers $d_1$, $d'_1$, $d_2$, $d'_2$, $d_3$, $d'_3$, etc., which are associated with devices capable of either releasing them or, on the contrary, locking them, this under the direct or indirect action of directional relays influenced by the direction of the defect currents, or fault currents.

It is known that a fault acts to cause, at the ends of above mentioned sections, currents and voltages to appear, the directions of which are determined by the location of the fault.

If a fault occurs, for instance, at T, in section CD, the currents $i_1$, $i'_1$ in section AB remain in phase, same as the currents $i_3$, $i'_3$ in section EF, while the currents $i_2$, $i'_2$ in the section CD where the fault has occured are reversed with respect to each other.

The object of my invention is to provide devices for comparing the voltages at suitable points of the system to control the release or locking of the above mentioned circuit-breakers.

These comparator devices are constituted by rectifiers of the contact type, arranged to discriminate, when a fault occurs, what protection apparatus (in the application of my invention that has been considered up to now) are to be released or operated. In these arrangements, I may make use either of the curvilinear portion or of the rectilinear portion of the current-voltage characteristic curve (Fig. 4) of the rectifiers.

In the first case, in which the current rectification law is expressed by: $j=kv^2$, means are provided for obtaining, in suitable rectification circuits, currents of the following form:

$$j = k(ai+bu)^2$$
$$j' = k(bu-ai)^2$$

from which, by subtraction, I obtain a function:

$$j'' = 4\ kabui$$

which represents a modulation, as in the preceding case.

Fig. 2 illustrates an arrangement corresponding to this. For this purpose, I make use of at least two transformers respectively fed by voltages $U_1$ and $U_2$ proportional to the two sinusoidal functions that are considered, these transformers being, on the other hand, suitably coupled with a system of rectifiers preferably arranged in such manner that they can rectify both of the current alternations.

In the arrangement of Fig. 2, the first transformer $T_1$ includes five windings. One of them, A, constitutes the primary and receives tension $U_1 = bu$. The four other windings $a, b, c, d$ (preferably identical and wound in the same direction) constitutes the secondary and are intended to be respectively connected to corresponding rectifiers or systems of rectifiers 21 to 24, and also to the secondary windings of the elements of the second transformer.

The latter is preferably made of two distinct elements $T_2$ and $T_3$, each of which includes three windings, to wit: A', a', b' and A'', a'', b''. Windings A' and A'' constitute the primaries and are fed with the voltage $U_2 = ai$, but in phase opposition. Windings a', b' and a'', b'' constitute the secondaries. They are also, for each transformer, mounted in phase opposition, as shown by the drawing.

The rectifiers are mounted in such manner that, in each half corresponding to one of the elements $T_2$ or $T_3$, the two rectifiers 21—22 or 23—24 are fed in opposite directions, the current therefore flowing alternately only through one of the two.

It will be readily understood that one of the halves performs the addition $ai+bu$ and the other the subtraction $bu-ai$. Therefore, I obtain in this way a current $j''$ of the form above set forth, which current can be either utilized directly, or transformed into a corresponding direct voltage, for instance by making use of suitably connected resistances, such as $t_1, t_2$ this voltage $w$ being obtained between two terminals such as G and H on the drawing.

If it is supposed that the values of resistance $t_1$ and $t_2$ are both equal to $r$, I obtain at said terminals the following voltage:

$$w = rj - rj' = 2\ r\ k\ ab\ U\ I$$

which is a direct voltage, positive if $U_1$ and $U_2$ are in phase (that is to say if U and I are in phase), equal to zero if the phase difference of U and I is 90°, and negative if this phase difference is 180°.

Control of the protection aparatus (circuit-breakers or the like) in response to variations of sign of this voltage will be performed through any suitable relays, with or without amplification. The whole is, for instance, adjusted in such manner that, as soon as a voltage $w$ appears and according as point H is positive or negative with respect to point G, either one or the other of relays $m^1, m^2$ is energized.

The same apparatus might, of course, be acted upon by several symmetrical components.

Fig. 3 shows a comparator device of the contact rectifier type particularly well (but not exclusively) adapted to be utilized on the rectilinear portion of the characteristic curve. Generally speaking, the diagrams are, in this case, of the same kind as those of Fig. 2, but simpler. The alternating voltages $u_1$ and $u_2$ are added together in the upper circuit of said Fig. 5 and subtracted from each other in the lower circuit, owing to the provision of suitable transformers, only the secondaries of which are shown on the drawing. The rectifiers are shown at $r_1, r_2, r_3, r_4$. The circuits are connected with resistance $\rho_1$ and $\rho_2$, and I thus obtain, between points $a$ and $b$ a voltage $ui$ which, in this case also, is impressed on two tubes $l_1$ and $l_2$. The relays for controlling the circuit-breakers are visible at $R_d$ and $R_v$. The operation is the same as that of the apparatus of Fig. 2.

Figure 6:
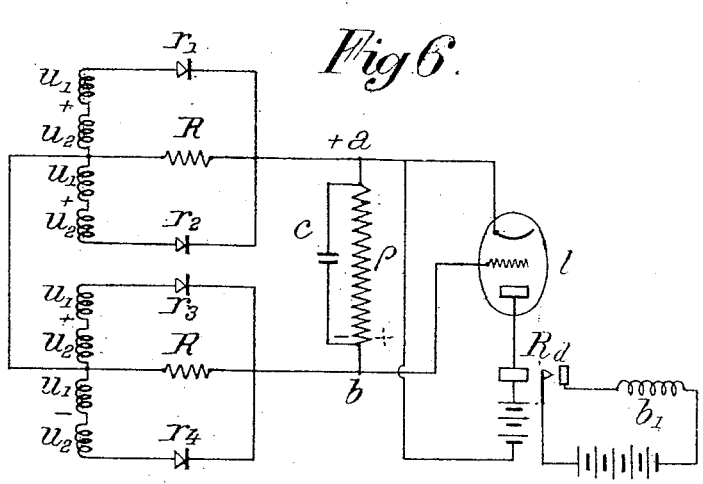
Figs. 6 and 7 show modifications of the diagram of Fig. 3.

I may also, as shown by Fig. 6, provide only one release relay $R_d$, in which case I employ only one tube $l$ connected to the ends $a$ and $b$ of the resistance.

Capacities may be provided, as shown at C across the terminals of $\rho$ (Fig. 6) to permit of adjusting the time constant to a minimum and thus to ensure the highest possible speed of operation. I may also, in order to reduce the value of this time constant, insert the release coil $b_1$ directly in the tube circuit (Fig. 7).

Figure 7:
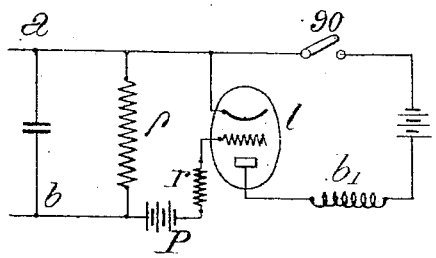

In Fig. 7, which shows an embodiment in which I make use of a thyratron, reference character P designates the grid polarization battery, provided with a resistance $r$. The anodic circuit includes a switch 90 for cutting the current therethrough after release of the circuit-breaker, for instance operative by the latter.

Figure 4:
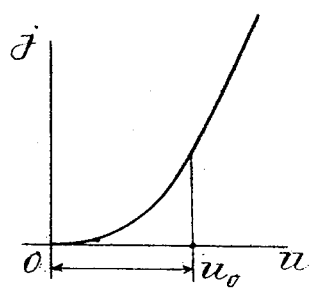
Fig. 4 shows the current-voltage curve of a contact rectifier, this curve being given to illustrate the working of rectifiers such as those shown by Figs. 2 and 3.
Figure 5:
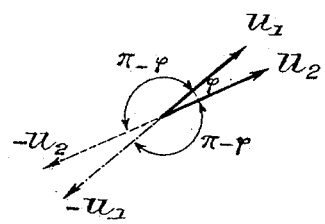
Fig. 5 is a diagram given for the same purposes.

It is interesting to explain why the arrangement of Fig. 5 works correctly in the case of operation along the straight portion of the characteristic curve (values of $u$ higher than $u_0$, Fig. 4). This results from the fact that the mean current flowing through resistances $\rho_1$ and $\rho_2$ is given by the following formula:

$$j_m = \frac{2}{\pi}[\sqrt{U_1^2 + U_2^2 + 2U_1U_2 \cos \varphi} - \sqrt{U_1^2 + U_2^2 - 2U_1U_2 \cos \varphi}]$$

Now, this is a periodic function, the period of which is $2\pi$. Therefore, if $\varphi$ is changed into $\pi \div \varphi$, the sign of the function is inversed and $j_m$ becomes $-j_m$.

Thus, it is found that the dry rectifier comparator devices according to the invention can work, according to the case, either along the straight portion or along the curved portion of the characteristic curve. In both cases the same result is obtained to wit the mean current $j_m$ is reversed under the effect of the reversing of only one of the two voltages $u_1$ and $u_2$. Besides, it should be noted that if both of these voltages change of sign (Fig. 5), the angle between these voltages remains equal to $\varphi$, so that the direction of the mean current is not modified. It should also be noted that the more or less complicated form of voltages $u_1, u_2$ is without influence upon the result obtained, since the Fourier series developement of the function that represents the rectified current shows that there remains, after this rectification, in addition to the constant term (mean value $i_m$) only terms in $2\omega t, 4\omega t$, etc., the mean value of which from zero to $\pi$ is zero.

Figure 8:
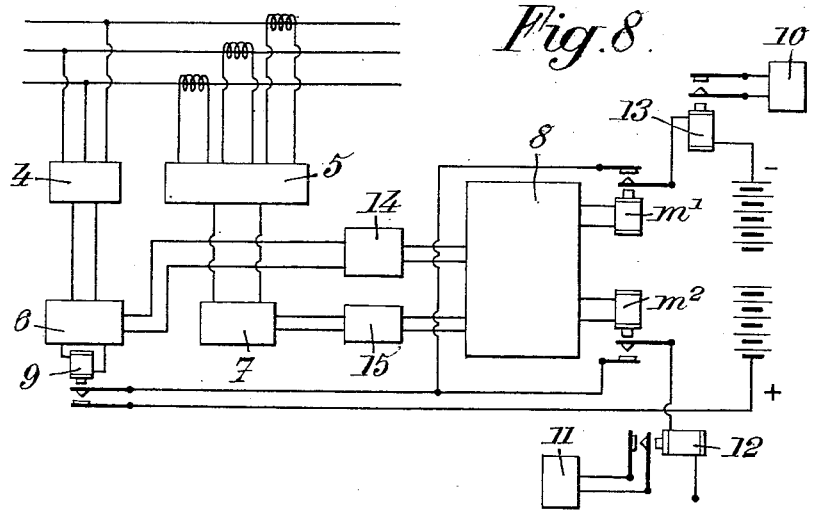
Fig. 8 is a general diagram of the protection apparatus to be provided at a section end, this apparatus making use of comparator devices according to the invention.

In Fig. 8, by way of specific example, I have grouped the essential devices above described which are to be provided on one of the apparatus at the end of a section. The voltage and current transformers are shown at 4 and 5. Reference numerals 6—7 designate the devices for filtering the symmetrical components. 8 is the comparator device as above described. $m^1$ and $m^2$ are the contact relays above described, and 9 is a starting relay. Relays $m^1$ and $m^2$ are supposed to act on the devices or groups of devices 10—11 through other contact relays 12 and 13.

In such a system, in order to permit of fixing the point of operation on the characteristic curve (Fig. 4), it is of interest to keep factors $i$ and $u$ within given limits. With the comparators according to my invention, the only important requirement is to obtain the direction, or sign, of the product of the factors that act upon the comparator elements relays (in the present case $u$ and $i$), (and not, as it was the case with electronic wattmeters as used at the present time, to measure the value of this product). Therefore, according to my invention, I provide, between filters 6 and 7 and comparator 8, devices, of any conventional type, for instance (such as comparators) 14 and 15 for ensuring this result.

Anyway, the various features above described permit of obtaining a selective or discriminating protection system which requires but a small amount of power, as compared with that required by electro-dynamic relays which gives rise to no self-inductance component (since the voltages can be collected directly at the terminals of the resistances), the inertia of which is substantially zero (so that its action is extremely quick), and which may give any desired sensibility, with the adjunction of amplifiers.

Besides, it should be noted that the selective, or discriminating, protection of electric networks has been considered merely by way of example. It should be well understood, in particular, that the sine functions that are considered, instead of corresponding to a current and a voltage, might represent any factors whatever (for instance two voltages or two currents), so that the invention may have many different applications, and, in particular:

Other embodiments of my invention will now be described.

According to one of these embodiments, the relays in question are utilized for comparing the respective phases of two currents or two voltages (or a current and a voltage) at any two points of an electric distribution system, in order to permit any desired regulation.

For instance, it is possible, according to the present invention, to record at any time the angular lag of the current or voltage along a line connecting, for instance, two stations $S_1$ and $S_2$ of an electric network (Fig. 9).

For this purpose it suffices to provide at one of the stations, for instance $S_2$, an apparatus such as 8 according to the invention (Fig. 9) and to impress thereon two voltages $U_1$ and $U_2$ the phase angles of which correspond respectively to those of said stations, the voltage $U_1$ that corresponds to station $S_1$ being transmitted through any suitable means, for instance through carrier currents. Apparatus 8, acting as a phasemeter, then gives at the output end thereof, in a circuit 25, a direct current the value of which measures the desired angle of lag, and which is eventually utilized for suitable regulations.

I have shown at 27 and 28 the voltage or current transformers that deliver the voltages $U_1$ and $U_2$ to be impressed upon apparatus 8. Voltage $U_1$ is transmitted through carrier waves, by means of transmitting and receiving apparatus 29 and 30.

For the discriminating protection of electric networks, I preferably make use, instead of relays of the wattmetric type as employed in the preceding embodiments, of other kinds of relays, for instance of the amperemetric, voltmetric, or analogous type, making or not use of the symmetrical components of the current.

An advantageous arrangement consists in applying the apparatus according to the invention to protection systems in which advantage is taken of the phase reversing that takes place, when a fault occurs, between the currents flowing at the ends of the section in which the fault has occurred. These apparatus will then act as phasemeters, in a manner analogous to that already illustrated by Fig. 9.

By way of example, I have shown on Fig. 10 a device of this kind. A line section is illustrated in this drawing, with its end circuit-breakers P—P', to be controlled by the protection system, the three cut-off elements of each circuit-breaker being operable separately.

The electronic apparatus according to the present invention are respectively inserted in the three phases, at $8_1$—$8_2$—$8_3$ for one end of the section and $8'_1$—$8'_2$—$8'_3$ for the other end. They are fed, on the one hand, with voltages proportional to the currents flowing through the phases at the corresponding end of the section, and, on the other hand, with voltages proportional to the currents flowing through the phases at the other end, the latter being transmitted through carrier currents.

For this purpose, the current transformers 31—31' permit of obtaining currents $i_1$—$i_2$—$i_3$ and $i'_1$—$i'_2$—$i'_3$ of the same respective phases as the currents $I$ and $I'$ that pass through the line, said currents being in turn transformed, through resistances or other suitable means 34—34', into voltages $e_1$—$e_2$ etc., themselves in synchronism, adapted to be fed to said apparatus. These voltages are transmitted from one end of the line section to the other end through carrier waves by means of the usual transmitting and receiving apparatus E—R—E'—R', on three different modulation frequencies $f_1$—$f_2$—$f_3$, also synchronous, and obtained in any suitable manner (for instance: respectively 50, 100 and 150 periods, these values being given merely by way of indication), these apparatus being coupled to the line at 32—32'.

Volume control or other devices 14—15 are provided at the input end of apparatus $8^1$—$8'_1$, etc. Finally, the direct voltage supplied by these apparatus controls the apparatus 33—33' adapted to actuate the cut-off elements of circuit-breakers P—P', etc. in a suitable manner.

It will be readily understood that, in the absence of a fault, the currents I—I' on any of the phases are in phase or, at least, have a constant phase difference with each other, so that the corresponding apparatus 8 or 8' are themselves fed with voltages of the same phase and therefore exert no action on the corresponding apparatus 33—33'.

If, on the contrary, a fault or short-circuit takes place, for instance on phase I, the corresponding end currents $I_1$ and $I'_1$ which were initially of the same direction are now out of phase by 180°. This immediately produces the operation of the corresponding apparatus $8_1$ or $8'_1$ and 33 or 33', which ensures the automatic release of the circuit-breakers of said phase.

As soon as the fault has disappeared, the initial conditions are restored and the circuit-breakers are reengaged in closing position, in an automatic manner, as known. The system constitutes by itself, due to its very principle, a phase sorter (since the three elements of each circuit-breaker are controlled separately, only that or those corresponding to the phase or phases concerned by the fault being operated).

According to my invention I make use of voltage limiting devices interposed on the input side of the comparator devices as above indicated. If it is true that the quickness of release is proportional to the mean current rectified in the comparator devices, which current is a function of voltages $u_1$ and $u_2$, which themselves increase simultaneously with currents $I_1$ and $I_2$, it is however necessary to limit these voltages to suitable values. It is possible to make use for this purpose of limiting devices of any known type, provided that their time constants are as low as possible.

For instance, it will be advantageous to make use of a device of the kind of that of Fig. 11, in which, in order to obtain a reduced voltage $u_r$ from a voltage $u$, I make use of rectifiers such as $d_1$, $d_2$, arranged in parallel.

Fig. 11 shows that the source S that supplies voltage $u$ feeds resistances $R_1$ and $R_2$ ($R_2$ representing the utilization resistance) with, in shunt, rectifiers $d_1$ and $d_2$ the current-voltage characteristic curve of which is parabolic. Therefore, the resistance of these rectifiers has a curve of hyperbolic shape, that is to say decreases simultaneously with the voltage at the terminals. Under these conditions, the drop of potential across resistance $R_1$ increases much more rapidly than the value of voltage $u$. Besides, it should be noted that this drop of potential is the greater as the value of the resistances of rectifiers $d_1$ and $d_2$ is smaller.

Finally, I obtain, for the utilization voltage $u_r$, a curve of the shape of that shown at F' on Fig. 12 (where F represents the initial voltage $u$).

It should be noted that the flattened curve F' that is thus obtained may be considered as the sum of sine curves the frequencies of which are $t$, $2t$, $3t$, $4t$, etc., but in which the rectifying effect has eliminated all odd numbered harmonics. Therefore, there remains only even-numbered harmonics which, as above stated, are without influence on the comparator device, since their mean value in a half-period is zero.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A phase comparator for two sinusoidal voltages both of the same frequency which comprises, in combination, two full-wave rectifier units including each at least one resistance and two contact rectifiers having each its output connected with the same end of said resistance so as to pass both of the rectified currents from said rectifiers respectively in the same direction through said resistance, voltage limiting means for transforming each of said sinusoidal voltages into a sinusoidal voltage in phase therewith but of constant amplitude, means for impressing on the two rectifiers of one rectifier unit a current proportional to the sum of said constant amplitude voltages and on the two rectifiers of the other rectifier unit a current proportional to the difference of said last mentioned voltages, one of the rectifiers of each rectifier unit being arranged to pass one alternation and the other the other alternation of the current imparted to said unit, one of said resistances having one end thereof connected with one end of the other, the two other ends of said resistances being connected to corresponding sides of said rectifiers so as to obtain across the ends of the whole of said two resistances in series a voltage equal to the difference of the respective voltages supplied by said rectifier units, an output circuit connected across said terminals and indicator means in said output circuit for giving the value of the constant voltage corresponding to the power factor in said output circuit.

2. A comparator according to claim 1 in which both of said rectifier units are identical and said resistances are of the same value.

ANDRÉ CHEVALLIER.

REFERENCES CITED

The following references are of record in the file of this patent:

UNITED STATES PATENTS

| Number | Name | Date |
|---|---|---|
| 1,200,796 | Arnold | Oct. 10, 1916 |
| 1,345,066 | Brackett | June 29, 1920 |
| 1,792,291 | Fitzgerald | Feb. 10, 1931 |
| 2,027,214 | Wideroe | Jan. 7, 1936 |
| 2,093,626 | Ward | Sept. 21, 1937 |
| 2,130,896 | Neugebauer | Sept. 20, 1938 |
| 2,147,781 | Ward | Feb. 21, 1939 |
| 2,183,537 | Bostwick | Dec. 19, 1939 |
| 2,256,078 | Crosby et al. | Sept. 16, 1941 |
| 2,281,995 | Purington | May 5, 1942 |
| 2,287,174 | Heising | June 23, 1942 |
| 2,357,932 | Crosby | Sept. 12, 1944 |
| 2,381,527 | Traver | Aug. 7, 1945 |